United States Patent [19]

Randazza

[11] Patent Number: 4,482,520
[45] Date of Patent: Nov. 13, 1984

[54] FUEL PIN TRANSFER TOOL

[75] Inventor: John B. Randazza, Brunswick, Me.

[73] Assignee: Maine Yankee Atomic Power Company, Augusta, Me.

[21] Appl. No.: 338,090

[22] Filed: Jan. 8, 1982

[51] Int. Cl.³ .............................................. G21C 19/10
[52] U.S. Cl. ..................................... 376/261; 376/271;
376/248; 376/251; 376/258; 294/86 A; 294/95
[58] Field of Search ............... 376/264, 268, 271, 229,
376/230, 231, 248, 258, 261, 249, 251, 253;
294/86.25, 95, 88, 86 A; 92/65, 113

[56] References Cited

U.S. PATENT DOCUMENTS

| | | | |
|---|---|---|---|
| T980,001 | 3/1979 | Minnick et al. | 376/248 |
| 3,066,969 | 12/1962 | Camac | 376/249 X |
| 3,114,799 | 12/1963 | Waters et al. | 376/249 X |
| 3,408,101 | 10/1968 | Savary | 294/95 X |
| 3,623,694 | 11/1971 | Goldberg | 92/65 X |
| 3,651,742 | 3/1972 | Winders | 376/230 X |
| 3,713,364 | 1/1973 | Francia | 92/65 X |
| 3,905,634 | 9/1975 | Johnson et al. | 294/86 A |
| 4,244,616 | 1/1981 | Buchalet | 294/86 A |
| 4,248,666 | 2/1981 | Olsson | 376/253 |
| 4,259,153 | 3/1981 | Pryamilov et al. | 294/86 A X |
| 4,269,558 | 5/1981 | Coppa et al. | 376/264 |
| 4,286,287 | 8/1981 | Williams | 376/248 X |
| 4,336,103 | 6/1982 | Katscher | 376/251 X |
| 4,363,972 | 12/1982 | Kuhlman et al. | 376/253 X |
| 4,416,847 | 11/1983 | Saito | 376/253 |

Primary Examiner—Richard E. Schafer
Assistant Examiner—Daniel Wasil

[57] ABSTRACT

A fuel pin transfer tool has a tubular housing of sufficient length to enable it to be suspended in a body of water in which a fuel pin assembly is submerged with the upper end of the housing above the water and with the tool in vertical alignment with a selected fuel pin from which the lower end of the tool is closely spaced. The housing has a cylinder spaced from its ends in which there is a piston having a tubular piston rod extending slidably through both ends of the cylinder. An actuator, the control for which has first and second positions, is fixed on the upper end of the piston rod and has a member extending freely downwardly therethrough which on short downward travel, resulting when the control is in its second position, effects the pin-releasing position of a latching device secured to the lower end of the piston rod. The pin-releasing position is held until the control is returned to its first position with the latching device held in its pin-gripping position until the control is again in its second position. When the piston is in its low position and the control is in its second position, the selected pin may then be gripped by the latching device when the control is in its first position.

26 Claims, 8 Drawing Figures

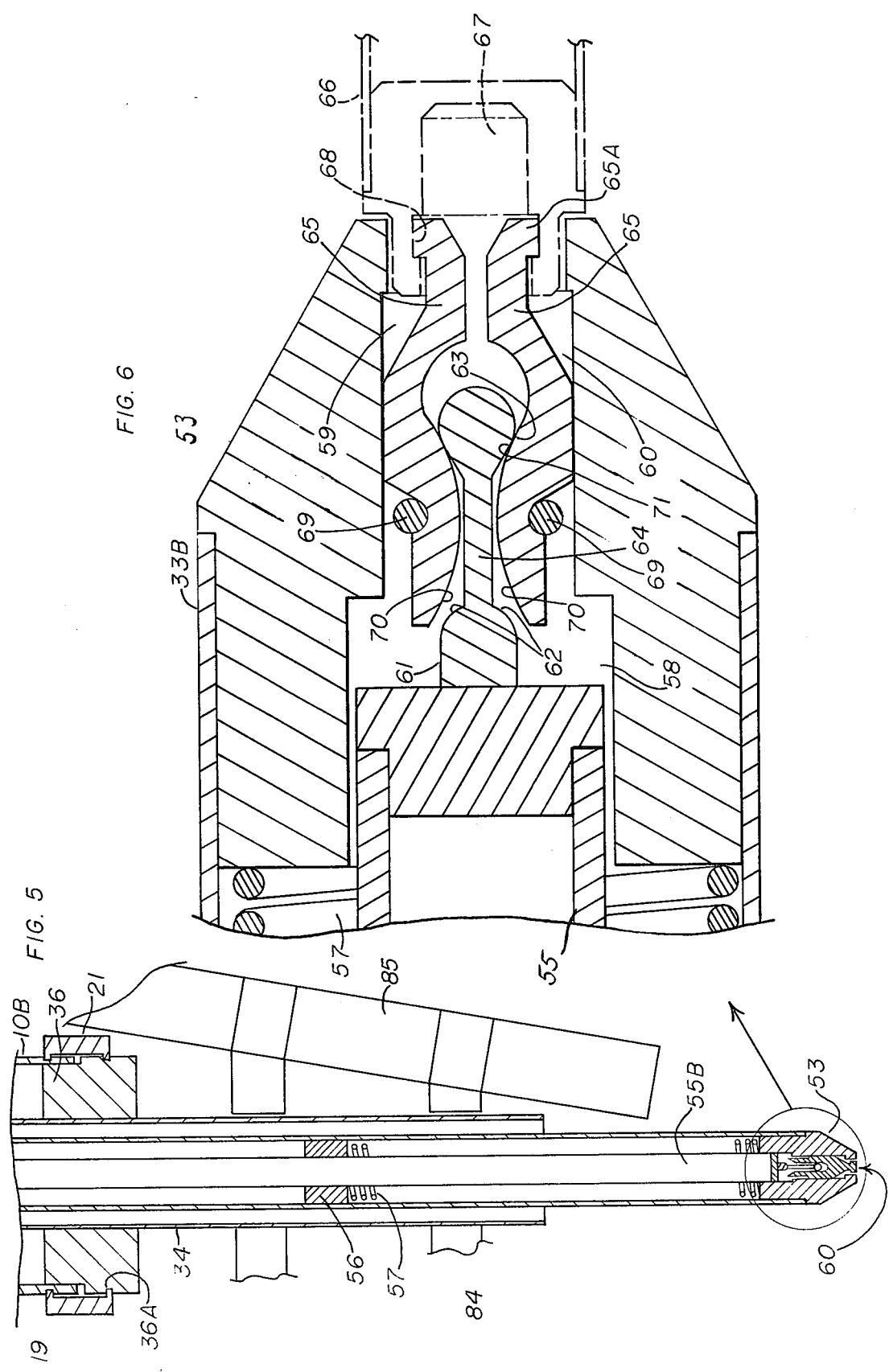

FUEL PIN TRANSFER TOOL

BACKGROUND REFERENCES

U.S. Pat. No. 3,905,634
U.S. Pat. No. 4,244,616
U.S. Pat. No. 4,254,153

BACKGROUND OF THE INVENTION

Fuel pin assemblies utilized in nuclear power plants are typically of the type consisting of a group of fuel pins held in square array with each pin separately and resiliently retained in a manner permitting its removal and replacement when an upper fitting or retainer is removed.

When the fuel pins of an assembly are spent, the assembly is stored in a deep pool or tank of water as the pins are still radioactive and periodic inspection is made of each fuel pin for clad defects and leakage but in so doing no portion of a pin may be closer than five to six feet below the surface of the pool water.

Tools are available that enable individual fuel pins to be gripped and withdrawn and then reinserted in the assembly but these are not sufficiently safe in operation to meet high standards of safety and are relatively inefficient since their use requires approximately a half an hour for the gripping, withdrawing and reinsertion of each fuel pin that is to be examined and tested.

THE PRESENT INVENTION

The general objective of the present invention is to provide a tool for use in the removal of a fuel pin from a spent fuel assembly for inspection and testing, reinsertion in the original or another assembly, or placed in a storage cage or container and that enables such handling of the fuel pins to be effected in a safe and efficient manner.

In accordance with the invention, this objective is attained with a tool having a long tubular housing adapted to be suspended by a travelling hoist with a substantial portion within the pool containing the fuel assembly, the pins of which are to be processed. The middle portion of the housing is a cylinder containing a piston actuated by fluid under pressure and having a tubular piston rod slidably sealed to the cylinder ends and extending downwardly through the lower portion of the housing and provided with a pin latching device. The tubular piston rod also extends upwardly into the upper end portion of the housing and supports an actuator having a two position control and an operating member extending downwardly through the piston rod. When the control is in its second position, a short downward stroke is imparted to the operating member which effects the pin-releasing position of the latching device which position is held until the control is in its first position and the pin-gripping position of the latching device is then positively held.

In the use of such a tool, the housing is lowered over a selected fuel pin by means of the hoist until the bottom end thereof is spaced but a predetermined short distance above that pin and in alignment therewith. The fluid pressure system used to drive the piston is operated to place the piston at the bottom end of the cylinder with the control in its second position, thus advancing the latching device in its pin-releasing position into which the pin is then gripped by returning the control to its first position. Fluid under pressure is then delivered into the cylinder below the piston to lift the pin from the assembly and draw it into the lower portion of the housing which is preferably of a length such that substantially the entire length of the fuel pin may be chambered therein.

A specific objective of the invention is to insure that the latching means is maintained in its pin-gripping position independently of the power source for the actuator. To that end, the latching means is positively held in that position unless and until the control is operative to effect its other position, preferably by resilient means operable otherwise by itself to effect the pin-gripping position of the latching means.

A second specific objective of the invention is to ensure maximum safety in operation, an objective attained by means of an interlock that prevents the unlatching of a pin unless the piston is close to its lowermost position.

A third specific objective, to ensure that fuel pins will not be damaged during withdrawal or replacement, is attained by the use of water under pressure to drive the piston in either direction together with adjustable means to so control the water pressure as to limit the forces exerted on the pin and its rate of travel as it is being withdrawn or inserted into an assembly. Desirably, but not necessarily, the water is tank water and the actuator is also operated by tank water under pressure.

A fourth specific objective is to utilize a port in the lower portion of the housing for plural purposes of which one is, with the port open, to provide natural thermal circulation of water around the pin when within the housing, another is to enable that port to be connected by a pump controlled conduit to a fission product detector system to detect fuel cladding defects, and lastly, to enable the tool to be flushed and drained.

A fifth specific objective is to provide a tool adapted both for assembly and service, an objective attained with the housing, tubular piston rod and the operating member for the gripped fingers consisting of detachable sections.

A sixth specific objective of the invention is to facilitate pin inspection, an objective attained by the use of one or more underwater television cameras carried by the tool and so focussed as to enable the tool to be precisely positioned relative to the selected fuel pin or a gripped pin to be precisely positioned relative to the location into which it is to be inserted and also to enable a gripped pin to be visually inspected as it is being withdrawn.

A seventh specific objective of the invention and attained thereby is to provide a tool with exposed surfaces that would not be repeatedly wetted by potentially radioactive contaminated pool water.

Other objectives of the invention will be apparent from the accompanying description of the preferred embodiment and the appended claims.

PRIOR ART STATEMENT

There are a number of patents concerned with the problem of removing and replacing such elements as control rods and fuel pins of nuclear reactors and tools are available for such purposes. All proposed and existing tools have latching devices, means by which the devices may be operated either to grip or release such elements and means by which the gripped elements may be withdrawn from or seated in a particular location.

It has been proposed to utilize fluid pressure operated units in such tools. In U.S. Pat. No. 4,244,616, a jack was shown for use in exerting a downward, seating thrust on an element with other operations effected by movements of a rod, extending axially through the jack, to operate the latching device by means of a handle on its upper end.

The use of fluid pressure operated means to withdraw an element is disclosed in U.S. Pat. No. 4,259,153, such means being located on a support externally of the body of the tool.

U.S. Pat. No. 3,905,634 disclosed the use of a bellows in the lower end of the tool to effect the gripping and releasing positions of the latching device.

No prior art, including the above referred-to patents, is known to the applicant which suggests a tool in accordance with the present invention in which a long stroke, fluid pressure operated, piston cylinder unit is incorporated in the tool with a tubular piston rod extending through both ends of the cylinder. An actuator, subject to a two position control is attached to the upper end of the piston rod to the lower end of which the latching device is secured. The actuator includes a member extending downwardly through the piston and when the control is in its second position, a short downward stroke is provided by which the latching device is placed in its pin-releasing position in which it is held until the control is in its first position in which it is positively held.

The cylinder is of such length that when the piston is driven from its low position, in which a pin may be gripped or released, into its upper position, the element is pulled free and into the tool. The tool may then be again operated to seat the gripped pin in its original or another location by operating the unit to drive the piston into its low position with the latching device then operated by the actuator to effect the release of the element.

BRIEF DESCRIPTION OF THE DRAWINGS

The accompanying drawings illustrate a preferred embodiment of the invention of which:

FIG. 5 is another like section taken through the lower end of the tool;

FIG. 6 is a fragmentary section, on a further increase in scale, of the latching device;

THE PREFERRED EMBODIMENT OF THE INVENTION

Figure 1:
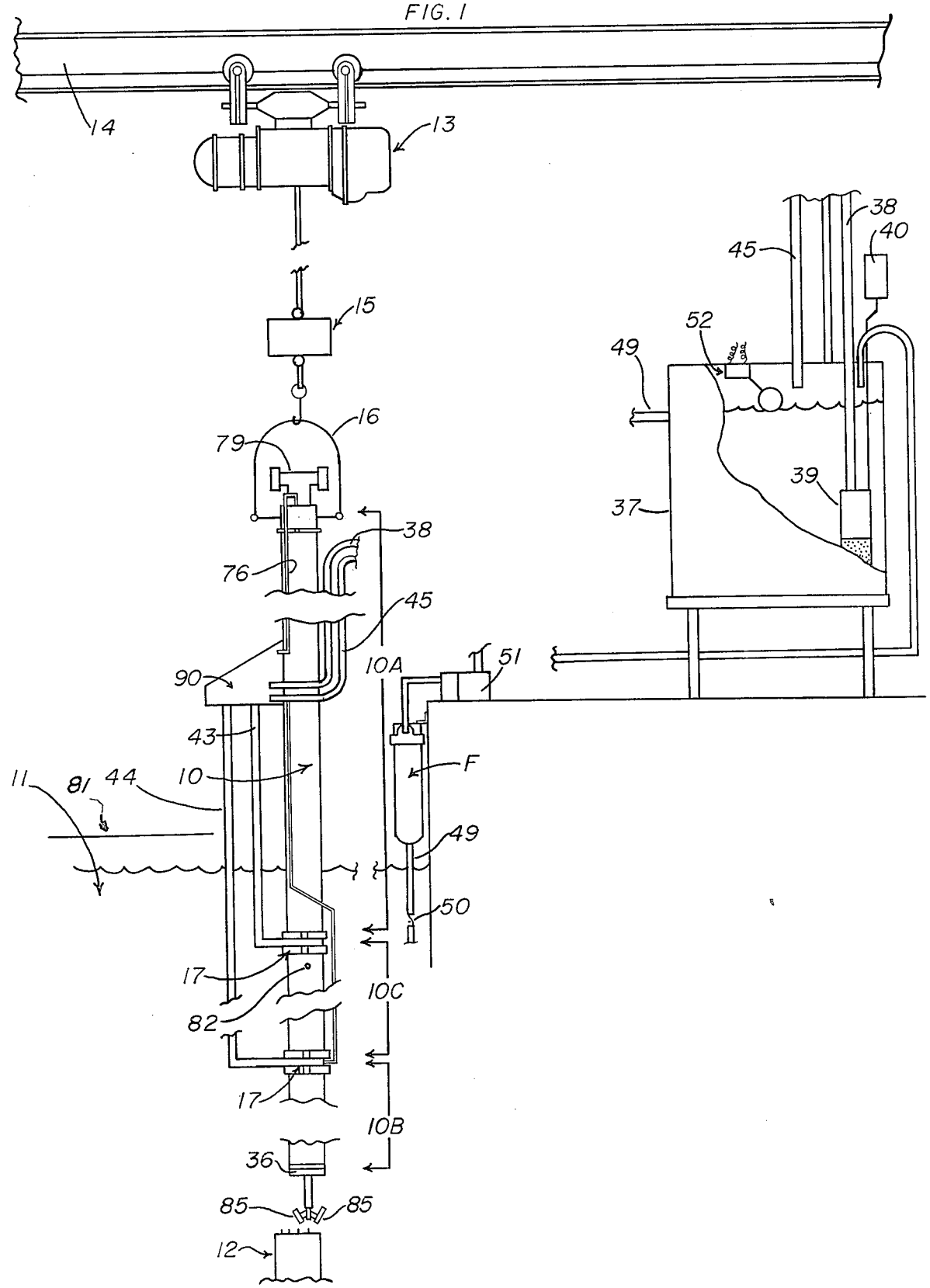
FIG. 1 is a somewhat schematic view of an installed tool for use in removing or installing fuel pins; the tool broken away to foreshorten the drawing.
Figure 2:
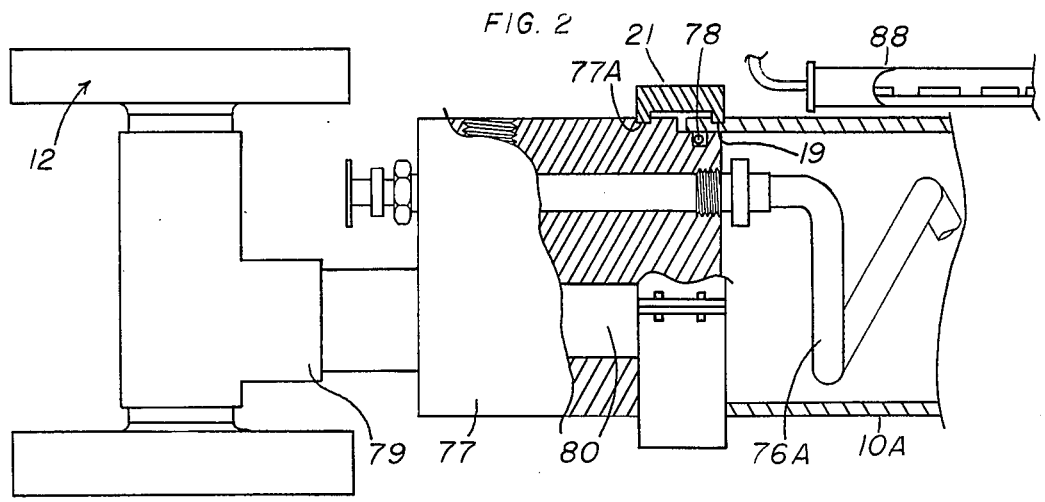
FIG. 2 is a fragmentary section, on a substantial increase in scale, taken vertically through the upper end of the upper portion of the tool.

The fuel pin transfer tool illustrated by the drawings has a housing generally indicated at 10 and is shown in FIG. 1 as held suspended and of such length that a substantial portion of its length is within a water pool or tank 11 deep within which a fuel pin assembly generally indicated at 12 is located. The means by which the housing 10 is thus held include a conventional travelling hoist 13 carried by an overhead beam 14 and an operated lift unit 15 connected to a bail 16 with whi the upper end of the tool is provided.

The housing 10 includes three sections, the upper section 10A, a lower section 10B and a middle section 10C. The ends of the middle section 10C are detachably joined to the proximate ends of the sections 10A and 10B by connections generally indicated at 17.

Figure 3:
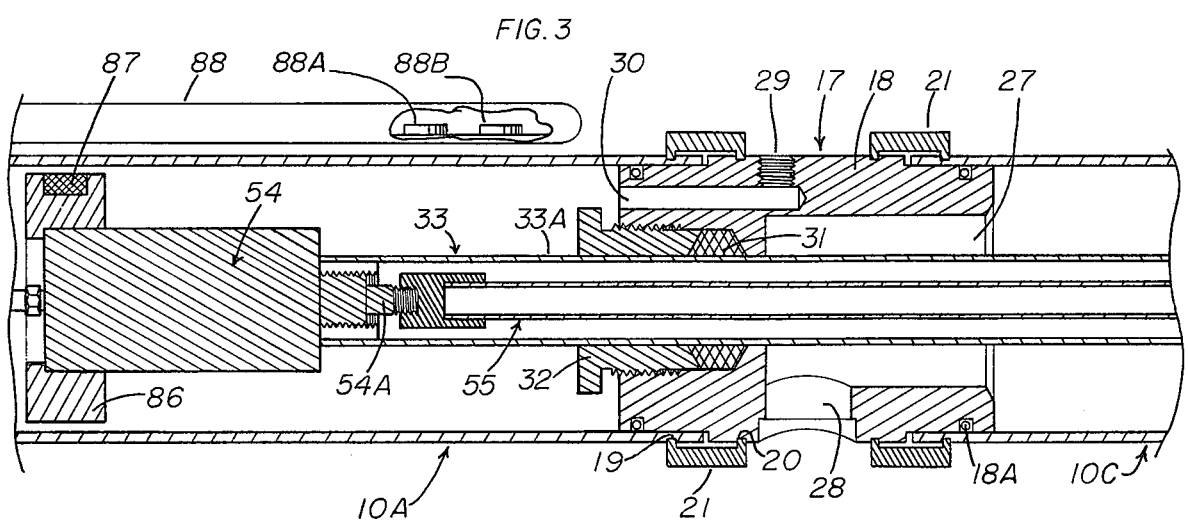
FIG. 3 is a like section through the junction of the upper and central portions thereof.
Figure 4:
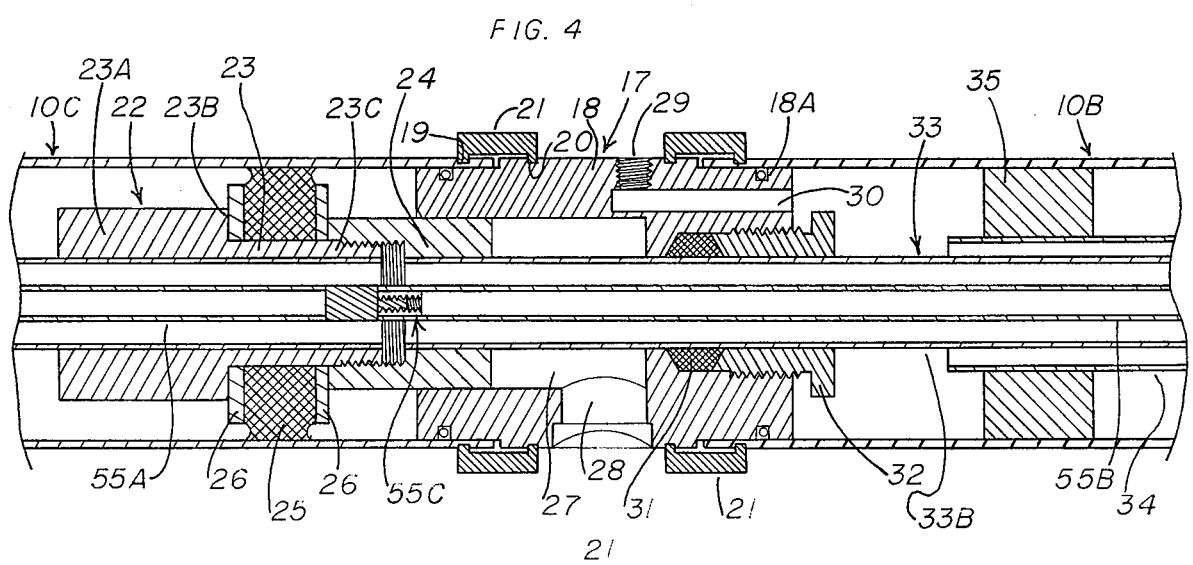
FIG. 4 is a like section taken through the junction of the central and bottom portions of the tool.

Each connection 17, see FIGS. 3 and 4, includes a fitting 18 which is shaped and dimensioned to fit the proximate end of the two housing sections to be joined thereby and which carry seals 18A. Both ends of each housing section have an annular groove 19 and each fitting 18 is also provided with a pair of annular grooves 20, each spaced to enable a clamp 21 to be caught therein and in the proximate groove 19 of a housing section.

The fitting 18 of each connection 17 thus closes the proximate ends of the interconnected sections with the middle section 10C serving as a cylinder in which is mounted a piston assembly generally indicated at 22. The piston assembly 22, see FIG. 4, consists of a piston sleeve 23 having an enlarged, cylindrical upper end or head 23A providing a shoulder 23B. The other or lower end 23C of the piston sleeve 23 is threaded to receive a nut 24 which is in the form of a sleeve the inside diameter of which is the same as that of the piston sleeve and the outside diameter the same as that of the head 23B. Mounted on the piston sleeve 23 is a compressible piston 25 confined between metal piston discs 26 and held against the shoulder 23B suitably compressed for sealing engagement with the walls of the cylinder 10C by adjustments of the nut 24. The head 23A and the nut 24 are of the same axial extent.

The fittings 18 are identical but are oppositely disposed and have their cylindrical axial recesses 27 opening into the cylinder 10C and shaped and dimensioned freely to receive the nut 24, in the case of the fitting of the lower connection 17, or the head 23A, in the case of the fitting of the upper connection 17, and of an axial extent such that engagement of a piston disc 26 with the fitting prevents the blocking of the port 28 opening into the cylinder. Each fitting 18 is also provided with a port 29 diametrically opposite its port 28 and placed in communication with the interior of the proximate section 10A or 10B by a passageway 30. The passageway 30 opening into the section 10A serves as a drain therefor. The purpose of the passageway 30 opening into the section 10B will be described later.

Each fitting 18 has an axial bore opening into a socket 31 for packing and threaded to receive a packing gland 32. The piston assembly 22 is fixed on a tubular piston rod 33 of such length that it extends slidably through both fittings 18. The piston rod 33 is shown as having two sections, the section 33A fixed in the sleeve 23 and extending upwardly into the upper housing section 10A and the section 33B fixed in the nut 24 and extending downwardly through the lower section 10B and a guide tube 34 which is held in the lower section 10B by a spacer 35 and by an end cap 36, see FIG. 5. The end cap 36 has an annular groove 36A enabling it to be connected to the lower end of the section 10B by a clamp 21 in the same manner as is employed to interconnect the three housing sections.

Figure 8:
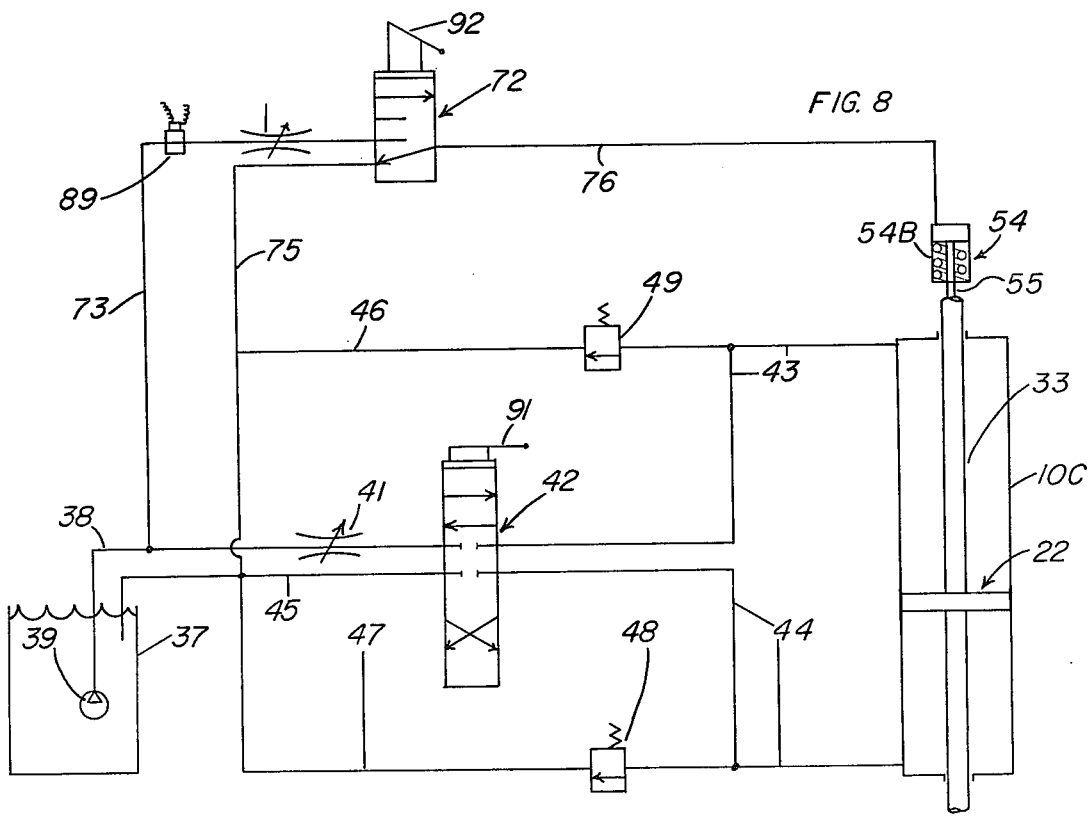
FIG. 8 is a schematic view of the hydraulic system used to operate the tool.

As illustrated by FIGS. 1 and 8, the piston assembly is raised and lowered through a wanted stroke, thirteen feet by way of example and not of limitation, as by water pumped from a tank 37 by means of a conduit 38 provided with a submersible pump 39 and operated by a control 40. The conduit 38 is provided with a valve 41 for adjusting the flow rate to and through the four way valve 42 which has a conduit 43 connected to the upper port 28 and a conduit 44 connected to the lower port 28, either conduit for delivery of water under pressure to one end of the cylinder 10C with the other then serving for the return of water from the other end of the cylinder 10C to the tank 37 via a conduit 45. The conduits 43 and 44 have parallel return conduits 46 and 47 each connected to the conduit 45 and provided with an adjustable pressure relief valve 48.

In practice, water from the tank 11 is used as the water source. To that end, a supply conduit 49 extends downwardly into the tank 11 and is provided with a check valve 50, a filter F and a pump 51, operated on demand of the float controlled switch 52.

The tubular piston rod 33 has a nose piece 53 secured to its lower end, see FIGS. 5 and 6, and an actuator 54, see FIG. 3, within the housing section 10A and fixed on the upper end thereof. The actuator 54 is shown as of a conventional fluid pressure operated type having a piston rod 54A advanced a predetermined short distance when fluid under pressure is applied to the actuator. The actuator 54 also has a spring 54B, see FIG. 8, operable to return the piston rod 54A when the actuator is relieved of fluid under pressure. The actuator 54 has its piston rod 54A connected to a tubular operating member or rod 55 shown as consisting of upper and lower sections 55A and 55B, respectively, having a threaded interconnection 55C within the piston assembly 22.

The spring 54B of the actuator is assumed not to be of sufficient strength to ensure that a wanted and later detailed function of the invention is accomplished. For that reason, the section 55B of the operating member has, see FIG. 5, a spring stop 56 which is a slidable fit in the tubular piston rod 33 and which holds a return spring 57 under suitable compression against the nose piece 53 which has a socket 58 opening into a counterbore 59.

A latching device, generally indicated at 60, see FIGS. 5 and 6, is under the control of the actuator 54 which is operable to impart a short downward stroke to the member 55 and is also under the control of the spring 57 which is operable, when the actuator 54 is relieved of operating fluid pressure, then to positively effect the return stroke of the member 55. The lower end of the member 55 includes a member 61 formed with oppositely disposed cam portions 62 and 63 spaced apart by an intermediate portion 64 extending freely between fingers 65 in the nose piece 53 for gripping the upper end of a fuel pin 66 which is shown as of the type having a socket 67 provided with an internal annular recess 68.

The gripper fingers 65 are pivotally held in the counter bore 59 of the nose piece 53 by transverse pivots 69 located between the cam portions 64 and 65 and have axially spaced cam portions 70 and 71 so that when the rod 55 is forced downwardly by the operation of the actuator 54, the cam portion 62 engages the cam portions 70 of the fingers, the outer and lower ends of which are then forced towards each other and when fluid pressure is relieved from the actuator 54, the spring 57 raises the rod 55 to bring the cam portions 65 into engagement with the cam portions 71 of the fingers with their outer ends then forced apart. The outer ends of the fingers have outwardly disposed shoulders 65A and when the actuator 54 is in control, these are positioned so close together that the shoulders 65A may be entered in the fuel pin socket 67 with the shoulders becoming caught in the annular recess 68 when the spring 57 is in control of the latching device. For fuel pins that have external shoulders to be gripped by the latching device, fingers are used which are spread apart in their pin-releasing positions and are drawn towards each other to establish their pin-gripping relationship.

Turning again to FIG. 8, it will be noted that a two way valve 72, the control for the actuator 54, has a conduit 73 having an adjustable pressure regulating valve 74 connected to the fluid pressure delivery conduit 38 and a conduit 75 connected to the conduit 45 by which water is returned to the tank 37. A conduit 76 in communication with the actuator 54 either delivers operating pressure thereto when the control valve 72 is in its second position or relieves the actuator of such pressure when the control valve 72 is in its first position.

The long travel of the piston 22 requires that the conduit 76 to the actuator 54 from the two way control valve 72 be provided with a resiliently coiled end section 76A of sufficient length within the upper section 10A to accommodate such travel. The section 76A is connected to the conduit 76 through an end cap 77 having a seal 78 and an annular groove 77A required to enable its connection to the housing section 10A by a clamp 21. A breather or venting assembly 79, connected to the end cap 77, is placed in communication with the interior of the housing section 10A by a passageway 80 extending through the end cap 77.

Turning now to the operation of the tool, it is normally positioned as shown in FIG. 1 with the lower end of the guide tube 34 a short distance above and in alignment with the selected fuel pin of the assembly 12 and with the piston 25 above its low position. As the control valve 72 is normally set in its first position so that the spring 57 is yieldably but positively holding the fingers 65 in their pin-gripping positions, the operator at the station 81 shifts the control valve 72 into its other or second position with fluid under pressure delivered to the actuator 54 causing the operating member 55 to advance and cam the fingers 65 into their closed or pin releasing position in which they may enter the pin socket 67. The control valve 42 is now set to deliver water under pressure to the cylinder 10C advancing the tubular rod 33 until the fingers 65 are within the socket 67 and the piston 25 is then bottomed. The operator now sets the control valve 72 in its first position to relieve the actuator 54 of operating pressure so that the spring 57 again positively returns the fingers 65 to and holds them in their pin-gripping positions.

The operator now sets the valve 42 in its position in which water under pressure drives the piston 25 upwardly with the gripped pin 66 pulled from the assembly upwardly and into the housing section 10B which is of a length to enable the pin to be chambered therein. As conventional fuel pins are twelve feet in length, the section 10B is desirably somewhat longer, thirteen feet long by way of example. With the pin in the section 10B, the port 29 at the lower end of the cylinder 10C permits normal thermal circulation of tank water through that section. If fuel clad leakage is to be monitored, a tube (not shown) is attached to the port 29 and to the intake of a pump by which water from the section 10B may be pumped through a fission product detector system. Neither the pump nor the detector is shown. A thermostatic relief valve 82 is operable to permit circulation through the section 10C if the temperature therein reaches a predetermined level during such a test.

In order to enable the tool to be accurately positioned relative to a selected fuel pin, the guide tube 34 is provided with one and preferably two sets of holders 83 and 84, each set for an underwater television camera 85 focussed so that the head end of a fuel pin to be extracted can be seen, the fuel pin being withdrawn from the assembly examined, and the position of the tool relative to the selected location for its return or relocation precisely established.

Because of the depth at which fuel assemblies are located, it is desirable to have other means by which the position of the piston 22 may be monitored. To that end and as an example of such means, see FIG. 5, the actuator 54 is shown as provided with a collar 86 having a magnet 87 which interacts with a conventional magnetic read switch stack 88 providing by means of a series of lamps, not shown, of which there is one for each switch and operated thereby when the magnet 87 is transversely aligned therewith to give visual information as to the then position of the piston. It is, of course, important that a pin withdrawn from its assembly be not prematurely released. To that end and as one means by which that function may be accomplished, the switch 88A of the switch stack 88 that represents the position of the piston 25 when so close to its low position that the latching device may be safely placed in its pin-releasing position, is employed to effect the energization of the electro magnet by which the normally closed valve 89 in the conduit 73 is opened. In that position of the piston 25, the pin-releasing position of the latching device must be open before the piston 25 reaches its bottom position in order that a pin may then be gripped and, in the case of a gripped pin, the pin will then be substantially seated when released, then to be fully seated when the piston is bottomed, a position in which the stack switch 88B is closed.

Figure 7:
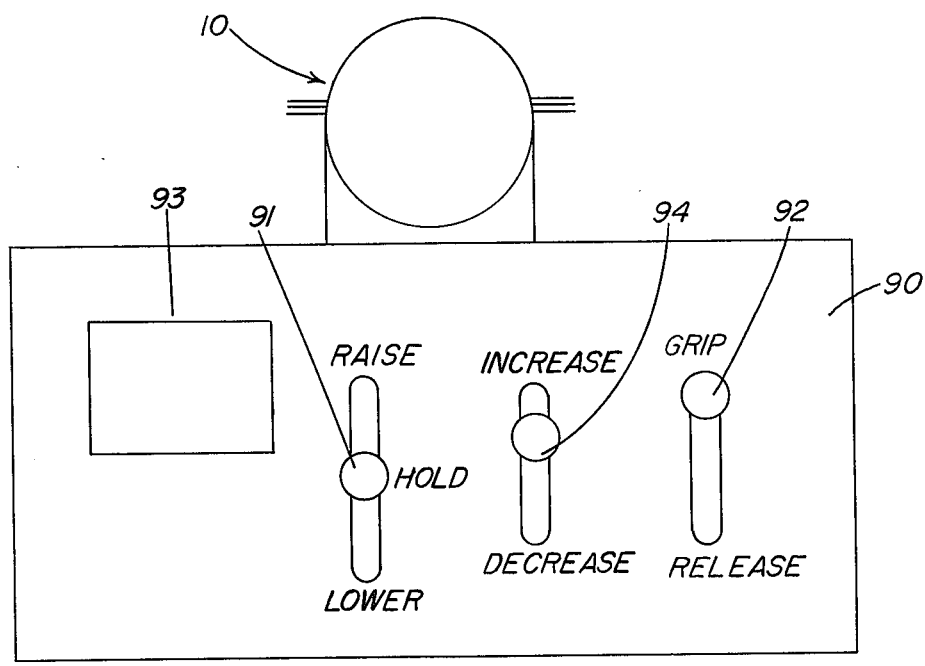
FIG. 7 is an elevational and somewhat schematic view of the control panel.

With reference to FIG. 7, the control panel 90 at the operator's station 81 is shown as provided with the operator 91 for the valve 42 and the operator 92 for the valve 72. The television screen 93 enables the operator to observe the latching device and the pin being withdrawn or repositioned while the control 94 enables the valve 41 to be adjusted to control or vary the rate of piston travel and the force exerted thereby in either direction.

I claim:

1. A fuel pin transfer tool, said tool including a tubular housing of such length that it may be suspended from a location above the water in a tank, in which a fuel pin assembly is stored at a substantial depth, with the lower portion of the housing extending downwardly in the water in vertical alignment with a selected one of the pins of said assembly and with the lower end of the tool close to and directly above said pin, axially spaced members within said housing and spaced from the ends thereof to establish a cylinder, a piston slidable in the cylinder, valve controlled fluid pressure operated means in communication with said cylinder and operable to reciprocate said piston between lower and upper positions, a tubular rod extending slidably through said cylinder-defining members and connected to said piston to travel therewith, pin latching means having pin-releasing and pin-gripping positions and connected to the lower end of said piston rod, and means operable to effect said positions and including an actuator secured to the upper end of said piston rod, an operating member within the piston rod and movable between first and second positions, said operating member movable by said actuator into said second position, the operating member so connected to the latching means that such movement effects and holds the pin-releasing position thereof, said operating means also including means in control of said operating member, except when said actuator is employed to effect such movement, to positively establish and maintain the pin-gripping position of the latching means, whereby with said fluid pressure operated means operated to drive said piston into its low position, and said actuator employed to effect said movement, said latching means is positioned to grip the selected pin, said pin gripped when said actuator is not so employed and then withdrawn when said fluid pressure operated means is employed to drive said piston upwardly, said cylinder and, the lower portion of the housing of such length that the gripped pin may be pulled free of the assembly and into said lower portion and whereby, with the fluid pressure operated means operated to return the piston to its low position, the gripped pin may be pushed downwardly, seated and released in its original or another location.

2. The fuel pin transfer tool of claim 1 and a control for the actuator located externally of the upper end portion of the housing, said control having first and second positions in the second of which movement is effected by which the pin releasing position of the latching means is established and a connection between said control and the actuator which includes a resilient coil which has a sufficient number of turns within the upper portion of the housing to accommodate the travel of the piston from its upper to its lower position.

3. The fuel pin transfer tool of claim 2 in which the actuator is operated by fluid pressure.

4. The fuel pin transfer tool of claim 3 in which the fluid pressure employed to operate the actuator and the fluid pressure employed to reciprocate the piston is water delivered under pressure from a tank.

5. The fuel pin transfer tool of claim 4 in which the tank water is water supplied thereby by the tank in which the fuel pin assembly is located.

6. The fuel pin transfer tool of claim 1 in which the fluid pressure operated means includes a control externally of the housing operable to adjust the pressure of the fluid delivered to the piston and accordingly its rate of travel and the force exerted thereby.

7. The fuel pin transfer tool of claim 1 in which the tool includes at least one underwater television camera attached to the lower end of the tool, and a viewing screen above the water and adjacent the upper end portion of the tool, the camera so focussed that the location of or for a fuel pin may be observed and a fuel pin being withdrawn or repositioned examined.

8. The fuel pin transfer tool of claim 1 in which the tool includes a guide tube within and supported by the lower portion of the housing which freely receives the piston rod and the latching means.

9. The fuel pin transfer tool of claim 8 and at least one underwater television camera attached to the guide tube and a viewing screen above the water and adjacent the upper end portion of the tool, the camera so focussed that the location of or for a fuel pin may be observed and a fuel pin being withdrawn or repositioned examined.

10. The fuel pin transfer tool of claim 1 in which the lower portion of the housing has a port adjacent its upper end enabling a chambered pin to be cooled by thermal circulation upwardly from the open end of the housing and through said port or said lower housing portion to be flushed.

11. The fuel pin transfer tool of claim 10 in which said lower portion includes a thermostatically operated relief valve operable to permit such thermal circulation in the event a fission product detector system is connected to said port.

12. The fuel pin transfer tool of claim 1 in which the operating member is rigid.

13. The fuel pin transfer tool of claim 12 in which the operating member extends downwardly through the piston rod from the upper end into the lower end thereof.

14. The fuel pin transfer tool of claim 12 in which the control means by which the operating member is maintained in a position holding the latching means in the pin-gripping position thereof is resilient and is backed by the lower end of the piston rod and connected to the operating member.

15. The fuel pin transfer tool of claim 1 in which the control means by which the operating member is maintained in a position holding the latching means in the pin-gripping position thereof is resilient and incorporated in the operating means in a manner yieldably establishing and maintaining the operating member in said position.

16. The fuel pin transfer tool of claim 1 and measuring means outside the housing adjacent its upper end portion providing visual information as to the location of the latching means.

17. The fuel pin transfer tool of claim 16 in which the measuring means includes a switch stack attached to the outside of the upper part of the housing and a magnet carried by the actuator which actuates any switch of said stack laterally thereof.

18. The fuel pin transfer tool of claim 1 and means to prevent the operation of the actuator in a manner to effect the pin-releasing position of the latching means unless the piston is in a predetermined position such that a fuel pin would be at least partly seated in a wanted location.

19. The fuel pin transfer tool of claim 18 and signal means operated when the piston is in said predetermined position.

20. The fuel pin transfer tool of claim 19 and signal means operable when the piston is in said lower position.

21. The fuel pin transfer tool of claim 18 in which a magnetically operated switch is located externally of the upper part of the housing in a position to represent said predetermined piston position and a magnet is movable with the actuator and is operable to actuate said switch when laterally thereof, and means controlled by the actuation of said switch renders the operation of said control effective to actuate the actuator to effect the pin-releasing position of the latching means.

22. The fuel pin transfer tool of claim 21 in which the actuator is operated by a fluid pressure system which includes a two position control valve and an electrically operated valve normally blocks the flow of fluid pressure thereto and is energized to open said valve when said switch is actuated.

23. The fuel pin transfer tool of claim 1 in which the housing includes three tubular sections, end caps, and detachable connections between said sections and said end caps, said piston rod includes two sections detachably connected to opposite ends of the piston, and the operating member includes two sections detachably interconnected centrally of the piston rod.

24. The fuel pin transfer tool of claim 1 in which the operating member includes at its lower end first and second axially spaced cam portions which are within the lower end of said piston rod, and the latching means includes a pair of pin-gripping fingers pivotally connected to said lower piston rod end between said cam portions, each finger having first and second cam portions located with the pivot axis between them and so spaced and disposed that, on movement of said operating member in one direction, the first cam portions thereof are brought into camming engagement with the first cam portions of the fingers and effect the pin-releasing positions thereof and, on movement of the operating member in the opposite direction the second cam portions thereof are brought into camming engagement with the second cam portions of the fingers and effect the pin-gripping positions thereof.

25. The fuel pin transfer tool of claim 23 in which a spring backed by the lower end of the piston rod is connected to and is operable to yieldably oppose movement of the operating member in a pin-releasing direction from a predetermined position in which the fingers are in their pin-gripping position.

26. The fuel pin transfer tool of claim 1 and at least one inspection means including an above water viewing portion and an underwater portion, said underwater portion attached to the lower end of the tool and said above water portion located adjacent the upper end portion of the tool and the underwater portion of the tool so positioned that the location of or for a fuel pin may be observed and a fuel pin being withdrawn or repositioned examined.

* * * * *